United States Patent
Mittal et al.

(10) Patent No.: US 9,575,849 B2
(45) Date of Patent: Feb. 21, 2017

(54) SYNCHRONIZED BACKUP AND RECOVERY OF DATABASE SYSTEMS

(71) Applicants: Kaushal Mittal, Dublin, CA (US); Mahendra Chavan, Pune (IN); Blaine French, Concord, MA (US); John Smirnios, Waterloo (CA)

(72) Inventors: Kaushal Mittal, Dublin, CA (US); Mahendra Chavan, Pune (IN); Blaine French, Concord, MA (US); John Smirnios, Waterloo (CA)

(73) Assignee: SAP SE (DE)

( * ) Notice: Subject to any disclaimer, the term of this patent is extended or adjusted under 35 U.S.C. 154(b) by 148 days.

(21) Appl. No.: 14/553,276

(22) Filed: Nov. 25, 2014

(65) Prior Publication Data
US 2016/0147614 A1    May 26, 2016

(51) Int. Cl.
*G06F 11/00*  (2006.01)
*G06F 11/14*  (2006.01)
*G06F 17/30*  (2006.01)

(52) U.S. Cl.
CPC ....... *G06F 11/1469* (2013.01); *G06F 11/1446* (2013.01); *G06F 11/1448* (2013.01); *G06F 11/1451* (2013.01); *G06F 11/1471* (2013.01); *G06F 17/30578* (2013.01); *G06F 2201/87* (2013.01)

(58) Field of Classification Search
CPC .............. G06F 11/1469; G06F 11/1451; G06F 11/1471; G06F 11/0727; G06F 11/1446; G06F 11/1448; G06F 11/1456; G06F 11/1458; G06F 11/1612; G06F 17/30578; G06F 2201/87

USPC .......... 714/6.1, 6.2, 6.23, 6.3, 42, 15, 19, 20
See application file for complete search history.

(56) References Cited

U.S. PATENT DOCUMENTS

| | | | | |
|---|---|---|---|---|
| 6,694,447 B1 * | 2/2004 | Leach | ................. | G06F 11/2038 |
| | | | | 707/999.202 |
| 7,225,307 B2 * | 5/2007 | Micka | ................. | G06F 11/2058 |
| | | | | 711/161 |
| 7,814,066 B1 * | 10/2010 | Persson | ............... | G06F 11/1474 |
| | | | | 707/640 |
| 2005/0028026 A1 * | 2/2005 | Shirley | ............... | G06F 11/1469 |
| | | | | 714/6.3 |

(Continued)

*Primary Examiner* — Joseph D Manoskey
(74) *Attorney, Agent, or Firm* — Sterne, Kessler, Goldstein and Fox P.L.L.C.

(57) ABSTRACT

Disclosed herein are system, method, and computer program product embodiments for utilizing a backup catalog to perform synchronized backup and recovery of heterogeneous database systems. An embodiment operates by performing a global data backup of a heterogeneous database system comprising a first database management system (DBMS) at a first server and a second DBMS at a second server and recording a global data backup entry identifying the global data backup into a backup catalog. Upon receiving log backup notifications regarding asynchronous log backups on the first server and the second server, log backup entries identifying the asynchronous log backups are recorded into the backup catalog. To successfully perform a point-in-time recovery, the embodiment operates by using the backup catalog to identify data and log backups required for the recovery of the first and second servers to a recovery timestamp associated with the point-in-time recovery.

20 Claims, 8 Drawing Sheets

(56) References Cited

U.S. PATENT DOCUMENTS

2006/0026452 A1* 2/2006 Suzuki .............. G06F 11/2097
                                                    714/2
2016/0026536 A1* 1/2016 Poluri .............. G06F 11/1451
                                                    707/645

* cited by examiner

| Time-lines | t0 | t10 | t15 | t20 | t22 | t25 | t28 | t30 | t35 | t37 | t40 | t47 |
|---|---|---|---|---|---|---|---|---|---|---|---|---|
| 0 | dbu0 | lbu10A | lbu15B | lbu20A | dbu22 | lbu25A | lbu28A | data, PITR30A,B | data, void | crash, lbu37A,B | void | |
| 30 | | | | | | | | | | | data | lbu47A,B |

FIG. 6B

Backup Catalog 106

| Time-stamp | Event-guid | Local-event-ID | Prev-Log-ID | Vol-ID | Timeline guid | Prev-Timeline guid | DBU Redo Offset | LBU Start Offset | LBU End Offset | PITR Branch Offset | Event Status |
|---|---|---|---|---|---|---|---|---|---|---|---|
| 0 | dbu0A | dbu0 | NULL | 120A | 0 | 0 | 0 | NULL | NULL | NULL | Success |
| 0 | dbu0B | dbu0 | NULL | 120B | 0 | 0 | 0 | NULL | NULL | NULL | Success |
| 10 | lbu10A | lbu10 | NULL | 120A | 0 | 0 | NULL | 0 | 45 | NULL | Success |
| 15 | lbu15B | lbu15 | NULL | 120B | 0 | 0 | NULL | 0 | 50 | NULL | Success |
| 20 | lbu20A | lbu20 | lbu10A | 120A | 0 | 0 | NULL | 46 | 100 | NULL | Success |
| 22 | dbu22A | dbu22 | NULL | 120A | 0 | 0 | 150 | NULL | NULL | NULL | Fail |
| 22 | dbu22B | dbu22 | NULL | 120B | 0 | 0 | 60 | NULL | NULL | NULL | Success |
| 25 | lbu25A | lbu25 | lbu20A | 120A | 0 | 0 | NULL | 101 | 200 | NULL | Success |
| 28 | lbu28A | lbu28 | lbu25A | 120A | 0 | 0 | NULL | 201 | 300 | NULL | Success |
| 35 | lbu35B | lbu35 | lbu15B | 120B | 0 | 0 | NULL | 51 | 100 | NULL | Success |
| 37 | lbu37A | lbu37 | lbu28A | 120A | 0 | 0 | NULL | 201 | 320 | NULL | Success |
| 37 | lbu37B | lbu37 | lbu35B | 120B | 0 | 0 | NULL | 100 | 100 | NULL | Fail |
| 37 | PITR30A | PITR30 | lbu37A | 120A | 30 | 0 | NULL | NULL | NULL | 310 | Success |
| 37 | PITR30B | PITR30 | lbu35B | 120B | 30 | 0 | NULL | NULL | NULL | 70 | Success |
| 47 | lbu47A | lbu47 | PITR30A | 120A | 30 | 0 | NULL | 321 | 400 | NULL | Success |
| 47 | lbu47B | lbu47 | PITR30B | 120B | 30 | 0 | NULL | 101 | 150 | NULL | Success |

700

Master Commit Log

| Transaction ID | Volume ID | Offset | Timestamp |
|---|---|---|---|
| 1 | 120A | 10 | 1 |
| 1 | 120B | 21 | 1 |
| 2 | 120A | 11 | 3 |
| 2 | 120B | 22 | 3 |

SYNCHRONIZED BACKUP AND RECOVERY OF DATABASE SYSTEMS

BACKGROUND

Many commercial database management systems (DBMs) currently exist on the market. Each database system has advantages and disadvantages associated with its particular implementation and architecture. For example, one database system may use in-memory databases, that may have better performance times compared to other database systems implemented using a disk storage design. However, in-memory databases generally may have a smaller memory storage compared to that of disk storage databases due to higher costs and associated technological constraints. In order to enhance overall database system capabilities, users may prefer to utilize a heterogeneous database system, composed of, for example, a hybrid of an in-memory database and a disk storage database. Backup and recovery are often needed to maintain and operate reliable and flexible database systems. Each particular database system may typically contain implementation and design specific backup and recovery strategies.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for performing synchronized backup and recovery of heterogeneous database systems. For example, a master server in some embodiments may maintain a master transactions log to synchronize transaction operations across cohort servers running potentially different database management systems (DBMSs) in the heterogeneous database system. In embodiments, the master server may maintain a backup catalog that is used to facilitate synchronized data backup and recovery across cohort servers running various DBMSs and/or track local log backups executed at the cohort servers. In further embodiments, the master transactions log and backup catalog on the master server allows the user to recover the heterogeneous database to the user desired recovery point or timestamp.

Figure 1:
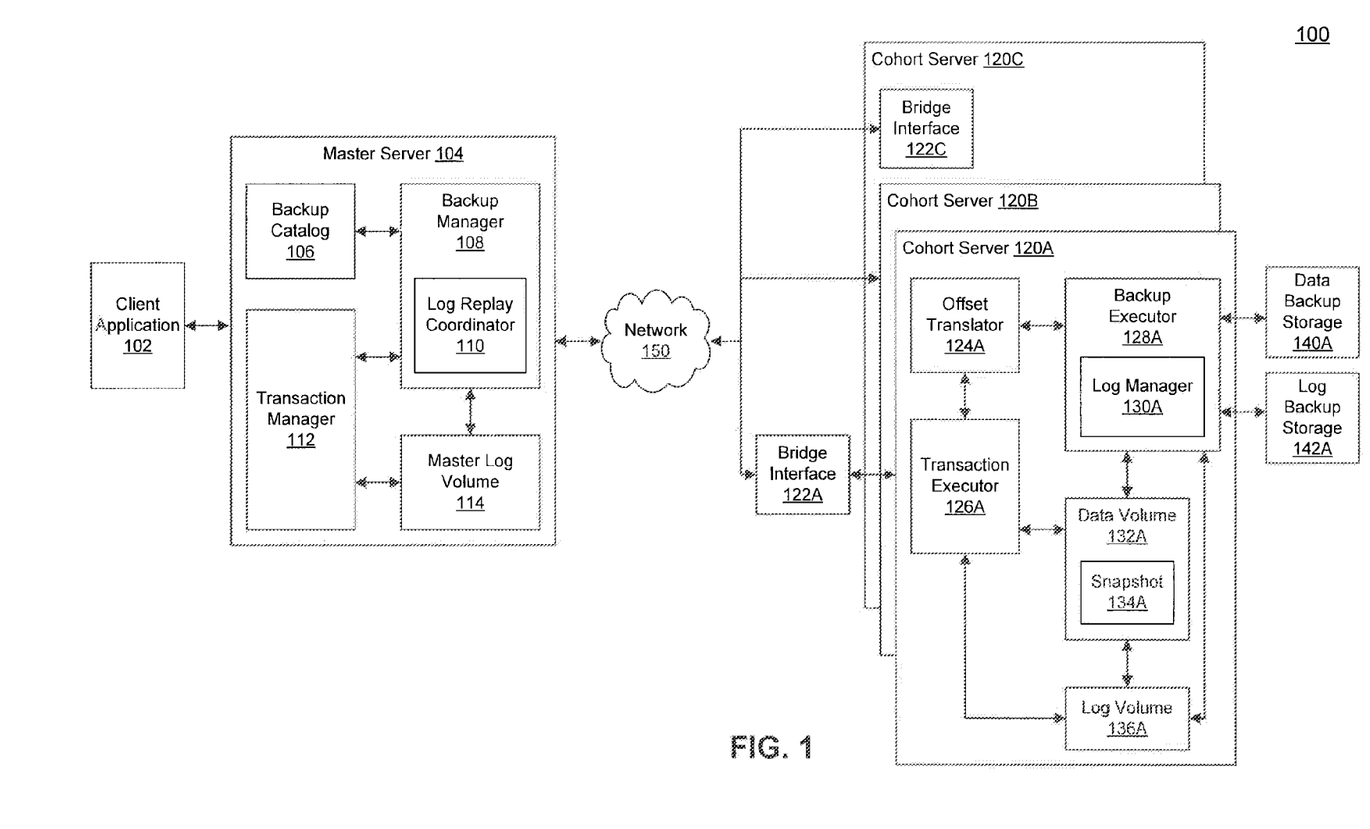
FIG. 1 is a block diagram of a heterogeneous database system that includes multiple database systems, according to an example embodiment.

FIG. 1 illustrates a heterogeneous database system 100, in accordance with an example embodiment. Heterogeneous database system 100 may include multiple servers, one of which may be designated as master server 104. Other servers may be designated as cohort servers 120. Heterogeneous database system 100 may further include components such as client application 102 and network 150.

Client application 102 allows the user to communicate with and issue commands to heterogeneous database system 100. Commands may include transactions such as committing transactions, performing backup, and performing system recovery among others. Client application 102 may be operated through a web interface on the Internet or through a computer application executing on a separate processor. Though client application 102 is connected to master server 104 in FIG. 1, client application 102 may have been connected to, for example, cohort server 120A in an embodiment. In this embodiment, cohort server 120A may include a topology module that is configured to identify master server 104 and redirect commands from client application 102 to master server 104 so transactions, backups, recovery, among other operations can be performed in a globally consistent manner in heterogeneous database system 100.

Network 150 allows servers 104 and 120 to communicate with one another in heterogeneous database system 100. Network 150 may be an enterprise local area network (LAN) utilizing Ethernet communications, although other wired and/or wireless communication techniques, protocols and technologies can be used.

Cohort servers 120 may each potentially run different DBMSs in order to manage operations of databases stored on the individual cohort servers 120. For example, cohort servers 120A and 120B may be running an in-memory DBMS due to a user's need for faster performance times. However, cohort server 120C may be operating a disk-storage DBMS due to the user's need for processing extremely large data volumes, for example, volumes on the petabyte scale. In another example, users may wish to scale their database system to different numbers of users as data needs and the user base changes over time. Consequently, other DBMS types may be desirable and utilized in heterogeneous database system 100. Embodiments of the invention allow for coordinating multiple database systems allow users to flexibly select combinations of suitable DBMSs configurations. In other embodiments, all cohort servers 120 may be running the same DBMS.

A DBMS on, for example, cohort server 120A may comprise computer software applications configured to define, create, query, update, and administer databases containing specially organized data on cohort server 120A. Generally, users may query and/or manipulate the data stored on cohort servers 120 through transactions using client application 102. The exemplary DBMS on cohort server 120A may then interpret the transactions and modify the databases accordingly. In order to maintain the ACID properties (atomic, consistent, isolated, and durable), operations in a transaction must all complete successfully or the transaction will fail. If no errors occurred while processing a transaction, the transaction may be committed, upon which operations of the transactions are applied and the data is persisted.

Though cohort servers 120 may be running different DBMSs, in an embodiment, cohort servers 120 may each share the same installation database system software, the same computing resources, and/or the same system administration, hut still appear to operate as isolated database systems. The cohort servers 120 may each use different data definition languages, backup formats, and backup and recovery strategies in accordance with the architectures and features of their respective operating DBMSs. In some embodiments, different DBMSs running on cohort servers 120 allow for data stored in databases on individual cohort servers 120 to be recovered to a globally consistent point in time, in part, because cohort servers 120 individually may recover to a specific point in time.

In an embodiment, cohort servers 120, such as cohort server 120A, perform backup and recovery by managing transactions, data backups, and log backups. Globally consistent transactions may be achieved using a two-phase commit protocol and variants thereof. In particular, upon receiving a transaction from master server 104, transaction executor 126A may process the transaction by accessing associated data in data volume 132A and/or write the transaction to log volume 136A. When cohort server 120A receives a command to prepare committing the transaction, transaction executor 126A similarly updates data volume 132A and log volume 136A. Log volume 136A may effectively contain the logged active transactions and associated commits that have not yet been backed up to log backup storage 142A. In other embodiments, log volume 136A may contain inactive and active transaction logs. If a transaction fails to commit, transaction executor 126A may send an abort notification back to master server 104. In an embodiment, when cohort server 120A receives a rollback transaction command from master server 104, transaction executor may need to undo modifications applied to data volume 132A. These undo logs for transactions may also be stored in log volume 136A. The rollback command may have been issued by master server 104 because of a failed commit on cohort server 120A, failed commit on other cohort servers 120, or due to user actions.

When transaction executor 126A notifies master server 104 of a processed transaction, a transaction offset produced by the offset translator 124A may also be sent in the notification. Offset translator 124A is a module internal to cohort server 120A that may be configured to both generate an outgoing transaction offset and translate an incoming transaction offset that allows a DBMS on cohort server 120A to locate the record for that transaction in log volume 136A or log backup storage 142A using that transaction offset. Offset translator 124 located in various cohort servers 120 operating different DBMS allow the cohort servers 120 to efficiently communicate with roaster server 104.

Backup executor 128A is a module or process configured to manage the data and log backups of cohort server 120A. According to an embodiment, when cohort server 120A receives a command from master server 104 to create a data backup, backup executor 128A may first create a snapshot 134A of data volume 132A. Upon successfully creating snapshot 134A, backup executor 128A may automatically start copying data pages of snapshot 134A to data backup storage 140A. Data backup storage 140A may be data storage within cohort server 120A or external storage (as depicted in FIG. 1) storing backed up data at various timestamps. In another embodiment, backup executor 128A may copy data from snapshot 134A to data backup storage 140A upon receiving the associated command from master server 104. Backup executor 128A may notify master server 104 of the status (successful, failure, pending, etc.) of the database system after creating snapshot 134A. In some embodiments, backup executor 128A may additionally notify master server 104 of the status of the database system upon completing copying data pages from snapshot 134A into data backup storage 140A. One potential advantage of generating data backups from database snapshots over generating data backups directly is minimizing the blocking time. In the former case, transactions may only need to be blocked during creation of snapshot 134A. In the latter case, transactions may need to be blocked while data is being copied from data volume 132A to data backup storage 140A and generating a data backup generally takes much more time than to generate a data snapshot. Backup executor 120A may also send, to master server 104, timestamps for completing generation of snapshot 134A and data backup in data backup storage 140A as well as a local backup ID identifying the backup in data backup storage 140A.

Data backups stored in data backup storage 140A allow DBMS running on cohort server 120A to recover data from a data backup associated with a timestamp at which the data backup was generated. However, to recover to a specific point in time, in an embodiment, cohort server 120A may need to save log backups to log backup storage 142A. As noted previously, transactions are stored by backup executor 128A to log volume 136A. In one embodiment, log manager 130A may periodically generate a log backup by copying transaction logs in log volume 136A to log backup storage 142A. In some embodiments, log manager 130A may initiate a log backup when the log volume 136A exceeds a set size or becomes full. In further embodiments, a combination of the previous approach may be used. For example, a log backup may be generated at least every 10 minutes (or another predetermined interval), if the log volume 136A exceeds 64 KB, or the number of logs in log volume 136A exceed 30,000 logs (other thresholds may also be used). Upon making a log backup, the space in log volume 136A may be freed and previous logs may be overwritten with new transactions received from master server 104. Frequently backing up logs may decrease the impact a corrupt log volume 136A may have on the database system.

In an embodiment, in order to coordinate different DBMSs in heterogeneous database system 100, information about log backups initiated in cohort servers 120 are transmitted to master server 104. For instance, when log manager 130A initiates a log backup, cohort server 120A may make a callback to master server 104, which allows master server 104 to obtain information regarding the log backup such as a local backup ID identifying the backup, a start offset, and a timestamp the log backup was initiated. Similarly, cohort server 120A may make a following callback to master server 104 when log manager 130A completes and commits the log backup to log backup storage 142A. This following callback may allow master server 104 to obtain a status of the log backup and an end offset. The start and end offsets are translated values generated by offset translator 124A that specify the start and end transactions and associated commit IDs of the log backup in log backup storage 142A.

Bridge interface 122A is a module that absorbs the differences between master server 104 and cohort server 120A in order for master server 104 to communicate with cohort servers 120 operating different DBMSs. For example, in an embodiment, while determining a specific timestamp for a global point in time recovery procedure, master server 104 may generate and propagate intermediate recovery timestamps and/or offsets to cohort servers 120. Due to the DBMSs performing different recovery strategies, cohort server 120A may only process intermediate recovery timestamps, intermediate offsets, or both. In some embodiments, cohort servers 120A may not be able to incrementally recover to the intermediate recovery timestamps or offset values. In this example, bridge interface 122A may buffer or filter out the intermediate recovery timestamps or offset values until the final recovery timestamp and/or offset is identified by master server 104. FIG. 1, illustrates bridge interface 122A as a module external to cohort server 120A, but bridge interface may also be an internal component, such as bridge interface 122C in cohort server 120C.

In some embodiments, other cohort servers 120 may contain analogous modules contained in cohort server 120A or at least be capable of performing the functions allowed by cohort server 120A modules.

Master server 104 may be configured to manage transactions, backups, and recoveries such that global consistency is maintained. Though in heterogeneous database system 100, master server 104 is distinguished from cohort servers 120, master server 104 may itself process transactions and contain the exemplary modules associated with cohort server 120A. In some embodiments, to perform a global backup and recovery that is consistent across the different DBMSs, master server 104 may need to use transaction manager 112 and master log volume 114 to synchronize transaction operations across cohort servers 120 (and master server 104 if master server 104 is also configured to process transactions).

Figure 7:
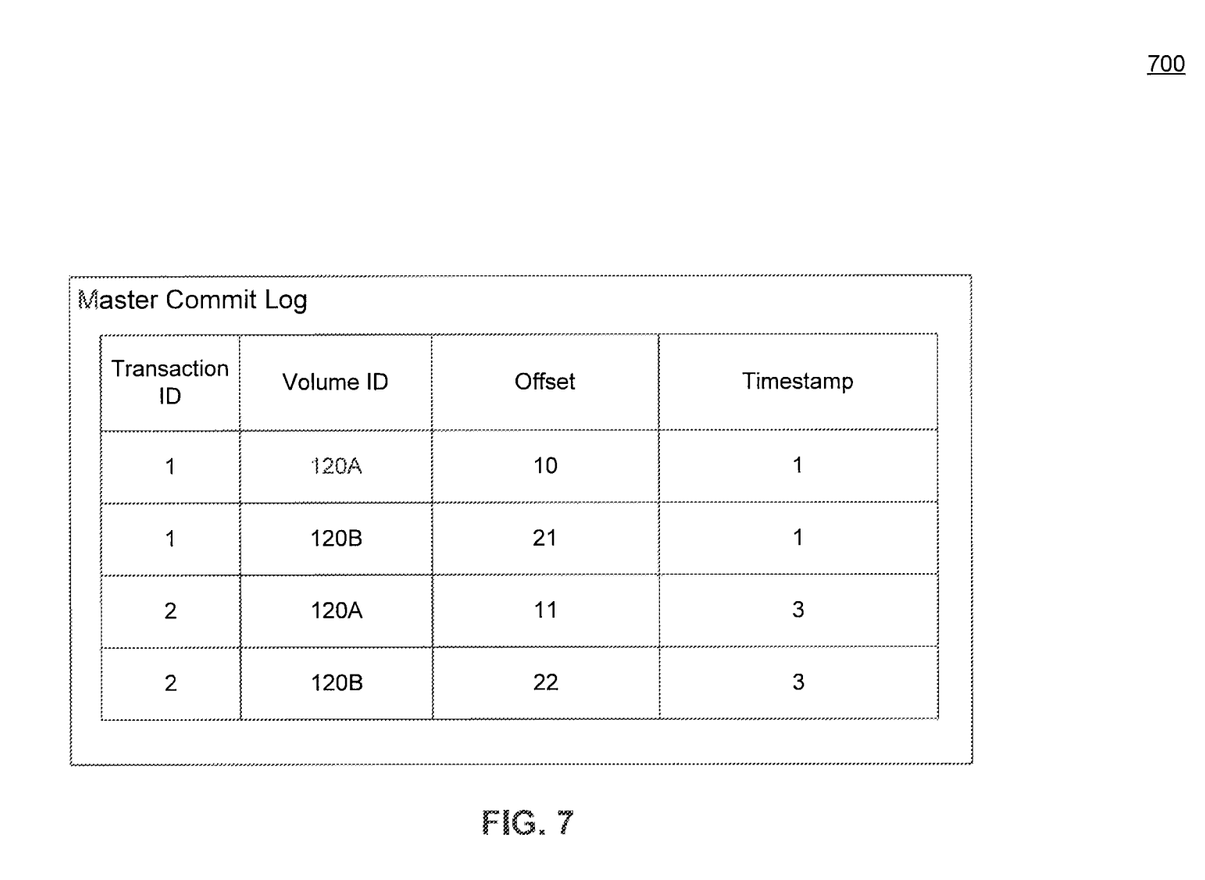
FIG. 7 is a diagram illustrating an exemplary master transaction log, according to an example embodiment.

FIG. 7 is a diagram illustrating an exemplary master log 700 stored in master log volume 114, according to an example embodiment. Master log 700 may contain transaction IDs, volume IDs, offsets, and timestamps. A first transaction, identified by "1" under transaction ID was distributed among cohort servers 120A and 120B, identified by "120A" and "120B" under Volume ID, respectively. The offset is a value used by the associated cohort server 120 to locate the particular transaction. As specified above, the offset value, for example, offset "10" may have been returned by cohort server 120A when transaction "1" was committed on cohort server 120A. The timestamp, which may use the UTC time standard, indicates the time at which the transaction was requested. Though not illustrated, master log 700 may contain additional fields such as a status field indicating whether a commit for the respective transaction entry succeeded or failed or the actual transaction operations. In an embodiment, actual transactions may not need to be stored because the actual operations are propagated to the target cohort servers 120 for processing and stored at cohort servers 120. In some embodiments, transactions and associated commits are separately logged in master log 700.

A master transactions log, such as master log 700, containing transactions and associated commits from client application 102 may be stored in master log volume 114. In an embodiment, master log 700 may also contain rollback records associated with the transactions. As noted previously, master server 104 may contain analogous components from cohort server 120A and perform a similar log backup procedure explained for cohort servers 120 to back up the master transmit log to an analogous log backup storage 142.

Figure 2:
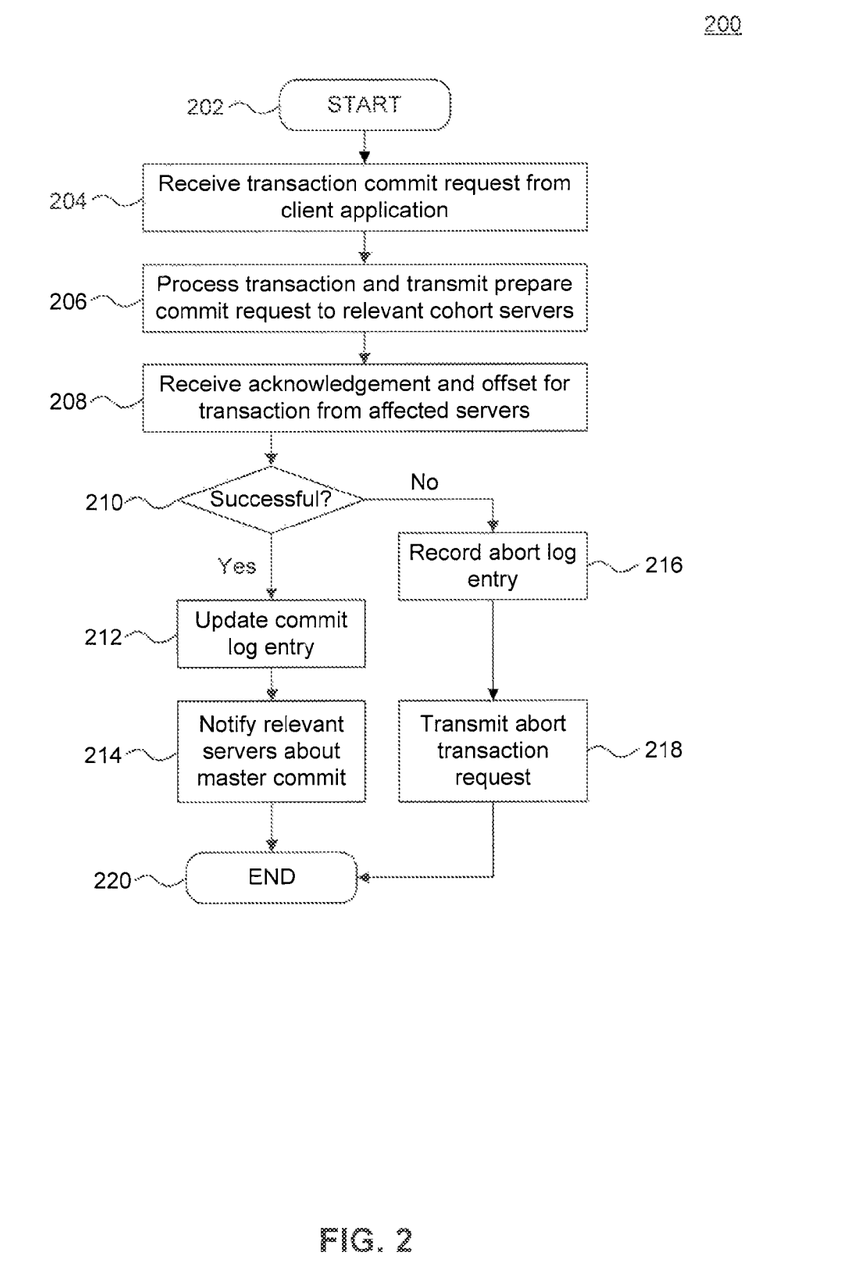
FIG. 2 is a flowchart illustrating a process for synchronizing a transaction commit in a heterogeneous database system, according to an example embodiment.

FIG. 2 is a flowchart illustrating an exemplary two-phase commit process for synchronizing a transaction commit in a heterogeneous database system across different database systems in further detail, according to an example embodiment. In an embodiment, the following steps may refer to the example master log 700 illustrated in FIG. 7 and heterogeneous database system 100 from FIG. 1. Method 200, starting at step 202, can be performed by processing logic that can comprise hardware (e.g., circuitry, dedicated logic, programmable logic, microcode, etc.), software (e.g., instructions run on a processing device), or a combination thereof.

In step 204, transaction manager 112 may receive a commit request from a user via client application 102. For example, referring to master log 700, a user may have requested a request to commit a transaction that is performed across cohort servers 120A and 120B at a timestamp of value "3."

In step 206, transaction manager 112 may process the transaction and transmit a prepare commit request to each of the cohort servers involved in the transaction. In the foregoing example, to process the transaction, transaction manager 112 may generate a transaction ID "2" for the transaction and insert the relevant volume IDs, "120A" and "120B," and timestamp(s), "3." Cohort servers 120A and 120B may each prepare to commit the transaction and each return an acknowledgement and transaction offset used by the respective cohort servers 120 to locate the transaction in either data volume 122 or log backup 142. As part of the prepare commit process, cohort servers 120 may write an additional entry to their local undo logs to permit cohort servers 120 to rollback transactions.

In step 208, transaction manager 112 receives respective acknowledgements and transaction offsets from cohort servers, such as cohort servers 120A and 120B in the foregoing example.

In step 210, transaction manager 112 may use the acknowledgements to determine whether the transaction was successfully prepared at the relevant cohort servers 120, such as cohort servers 120A and 120B in the foregoing example.

In step 216, if at least one acknowledgment indicated a failure to prepare the commit request in step 210), transaction manager 112 may record or log an abort log entry into the master log.

In step 218, transaction manager 112 may transmit an abort transaction request to the relevant cohort servers 120, for example, cohort servers 120A and 120B in the foregoing example. The effected cohort servers 120 may rollback or undo the transaction using the previously entered undo logs.

In step 212, if the prepare commit request was successfully acknowledged at the relevant cohort servers 120 (in step 210), transaction manager 112 may update the master log entry. For transaction "2," transaction manager 112 may populate the offset field with "11" for volume ID "120A" and "22" for volume ID "120B" based on the received transaction offsets received from the respective cohort servers 120A and 120B.

In step 214, transaction manager 112 may notify the relevant cohort servers 120 about successfully committing the transaction in the master log. The relevant cohort servers 120 may then commit the transaction to their local transaction logs 136. The method 200 ends in step 220.

Backup manager 108 may be configured to perform a system-wide consistent backup and recovery. In an embodiment, to create a global data backup, backup manager 108 may create data backup entries associated with the relevant cohort servers 120 in backup catalog 106. As noted above, backup manager 108 may request cohort servers 120 to individually create internal and local snapshots 134. The process for creating a synchronized backup is further detailed in FIG. 3 below. In some embodiments, backup manager 110 may need to record information about log backups asynchronously executed on cohort servers 120 in backup catalog 106 in order to allow cohort servers 120 to each recover to a point in time that is globally consistent. The process for keeping track of log backups executed on cohort servers 120 is further detailed in FIG. 4 below. Finally, using the backup catalog 106, backup manager 108 may allow a user to recover using a previously saved data backup or to a recoverable point in time. If recovery to the desired point is not possible, master server 104 may identify the latest point in time to which heterogeneous database system 100 may successfully recover. The process of recovering is further detailed in FIG. 5 below.

Figure 6A:
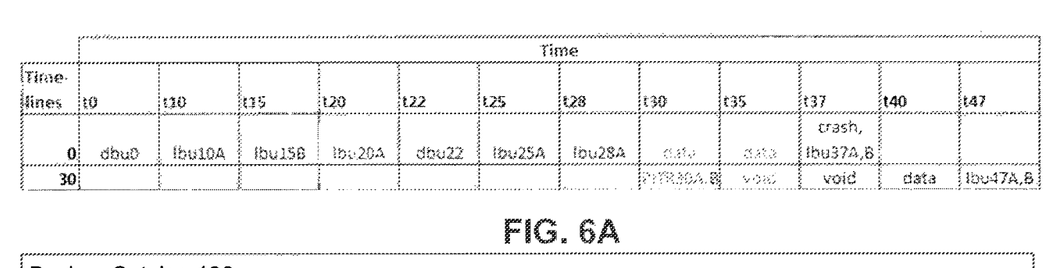
FIG. 6A is a diagram illustrating a sequence of events occurring in a database system, according to an example embodiment.

FIG. 6A is a diagram illustrating an exemplary sequence of events from a time "t0" to a time "t47" occurring in a database system such as heterogeneous database system 100, according to an example embodiment. The timelines "0" and "30" depict the original backup events and a subsequent timeline after restoring to a time "t30" at time "t37." This recovery event point is a point-in-time recovery (PITR) occurring at time "t30" labeled as PITR30. The events may include data backups (dbu), log backups (lbu), or data indicating data may be generated but no backup event has taken place. The letters "A" and "B" associated with events indicate the associated cohort servers 120A and 120B, respectively, that initiated the event.

In the first timeline "0", heterogeneous database system 100 may have crashed at time "t37." The user may then have chosen to recover the system to time "t30". In some embodiments, when a recovery process is initiated, backup manager 108 may require the relevant cohort servers 120, such as cohort servers 120A and 120B, to each write its own log backups. In this example, log backups "lbu37A" and "lbu37B" were also initiated at time "t37." Upon successfully recovering to a time "t30," a second parallel timeline "30" of events may be generated.

Figure 6B:
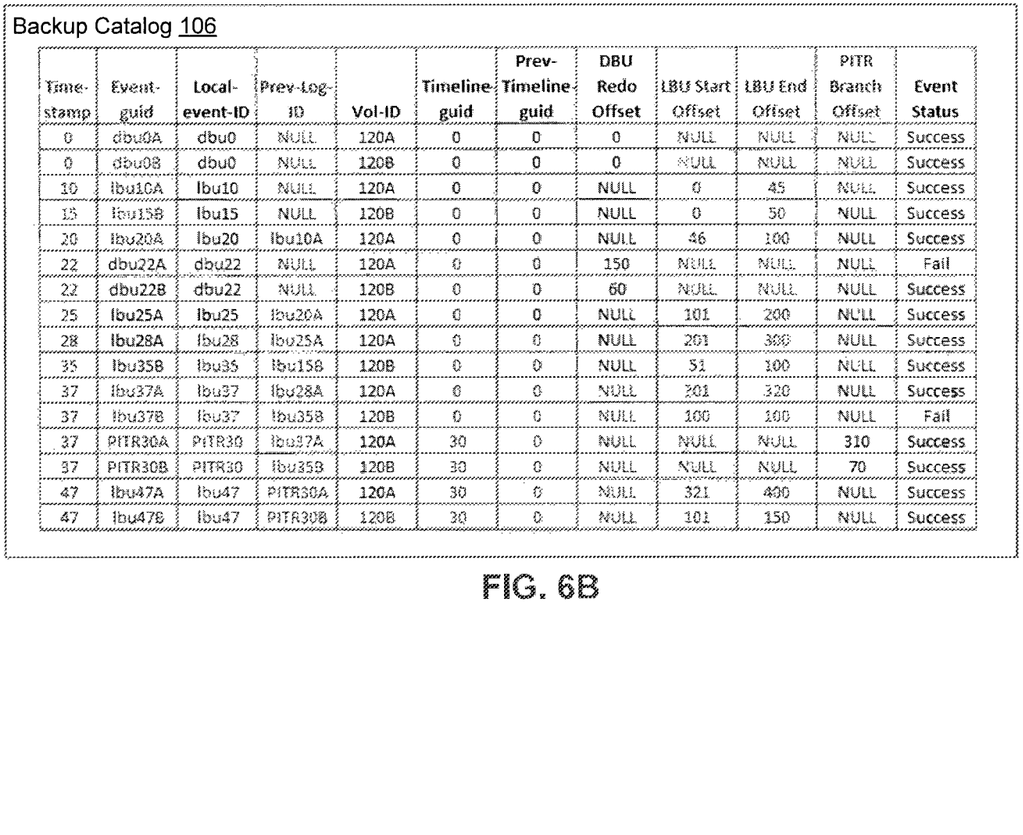
FIG. 6B is a diagram illustrating an exemplary backup catalog storing the backup events of the sequence in FIG. 6A, according to an example embodiment.

FIG. 6B is a diagram illustrating an exemplary backup catalog 106 storing the backup and recovery events of the sequence of events from FIG. 6A, according to an example embodiment. Though backup catalog 106 is illustrated in a table format in FIG. 6B, backup catalog 106 may be maintained as other types of data structures. In this embodiment, backup catalog 106 stores various fields for each backup or recovery event. For data backups (dbu), log backups (lbu), and point-in-time recoveries (PITR), the following types of fields may be recorded: timestamp, event-guid, local-event-ID, vol-ID, timeline-guid, prev-timeline-guid, and event status. The timestamp may indicate the time at which the event was initiated at the backup manager 108 on master server 104. The event-guid may be a global unique ID which identifies a particular event. The vol-ID may identify the specific cohort server 120 that is currently or has completed processing the specified event. The local-event-ID may be an ID value that allows the cohort server 120 identified by vol-ID to locate the particular recorded event. Timeline-guid may indicate the latest timeline and the prev-timeline-guid indicates the timeline from which the event has branched. Event status may indicate if the particular event is successful or failed. In an embodiment, the event status may also be pending.

There may be other fields that contain data specific to a particular event. In an embodiment, backup catalog 106 may also contain start and end offsets for log backups, labeled as "LBU start offset" and "LBU end offset," respectively. These offset values, as previously explained, are values received from cohort servers 120, that allow cohort servers to locate the first and last transaction records of the associated transaction logs.

Backup catalog 106 may also contain a database redo offset (DBU Redo Offset) indicating redundant records of the transaction log in the associated cohort server 120. For example, a database backup "dbu22A" may have initiated at time "22" for cohort server 120A. Since a log backup "lbu20A" for cohort server 120A was last made at time "20," a data backup at time "22" will necessarily include data changes made by transactions occurring between time "20" and "22," The DBU redo offset value "150" may allow cohort server 120A to identify transactions that were applied to the database by time "22."

Figure 4:
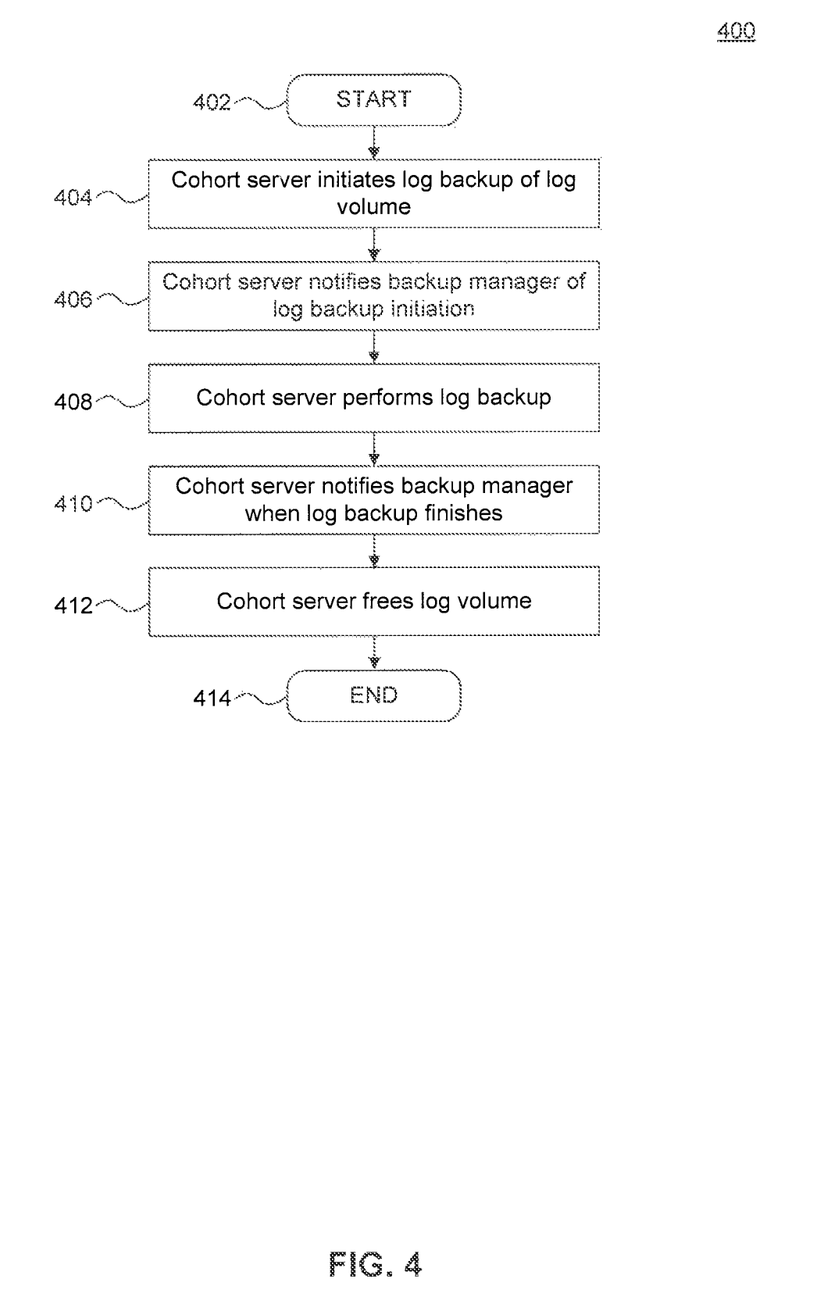
FIG. 4 is a flowchart illustrating a process for implementing log backups at a server using a specific database management system in a heterogeneous database system, according to an example embodiment.
Figure 5:
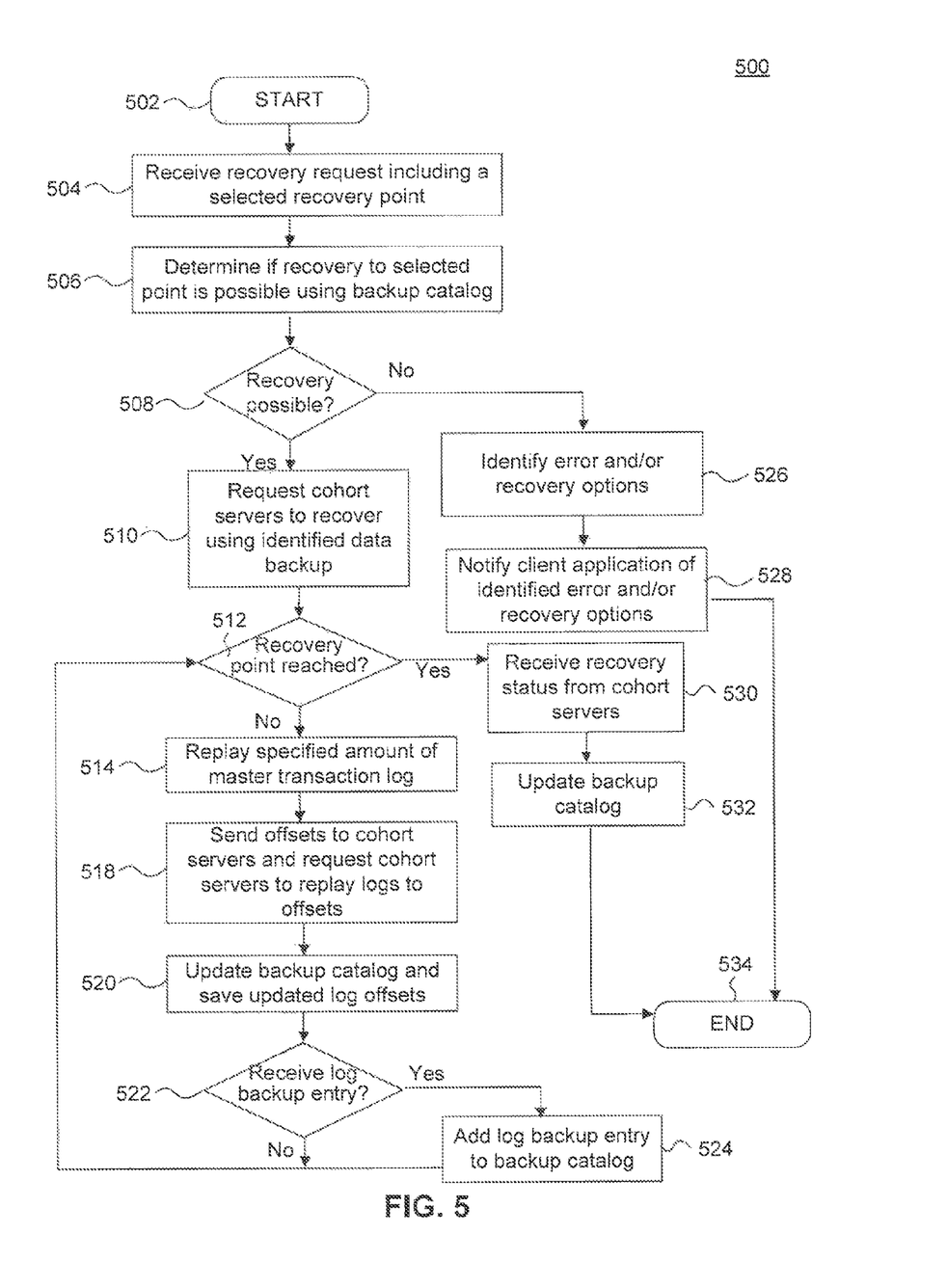
FIG. 5 is a flowchart illustrating a process for implementing consistent data recovery in a heterogeneous database system, according to an example embodiment.

A previous log ID field may also be maintained for log backups and point-in-time recovery records which may contain a pointer to an earlier logical event, such as an earlier log backup. Backup manager 108 may use the prev-log-IDs to determine a list of log backups needed to executed a point-in-time recovery for the relevant cohort servers 120. Additionally, backup manager 108 may use the prev-log-IDs in conjunction with the event status information to determine if recovery to a specific point in time is even possible. Finally, a point-in-time offset "PITR Branch Offset" may be inserted for a PITR to indicate the particular location in a log backup when a new timeline was generated. The following FIGS. 3-5 illustrating flowcharts for backup and recovery may be better understood in the context of the exemplary sequence of events in FIG. 6A and the associated data stored in backup catalog 106 of FIG. 6B.

Figure 3:
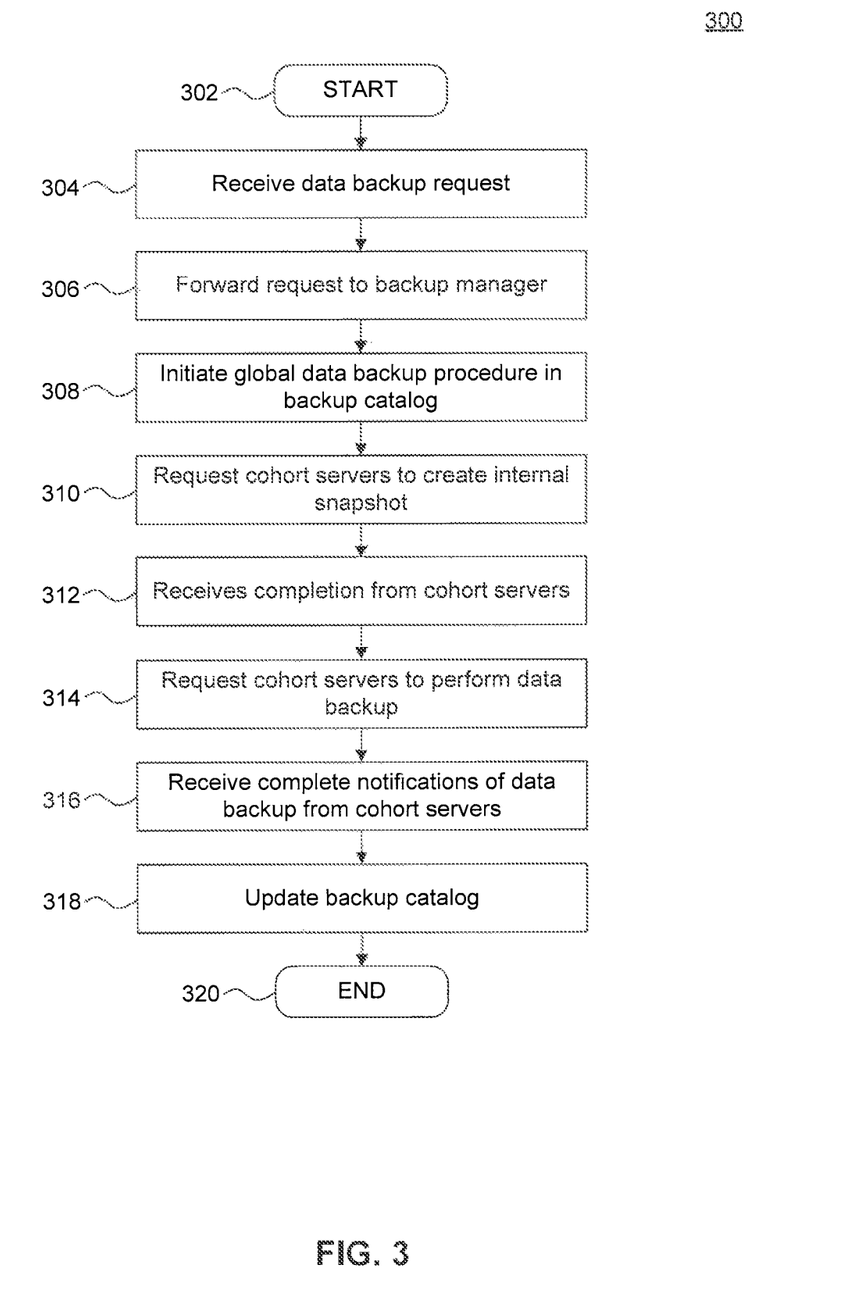
FIG. 3 is a flowchart illustrating a process for performing a synchronized data backup in a heterogeneous database system, according to an example embodiment.

FIG. 3 is a flowchart illustrating a process for performing a synchronized data backup in a heterogeneous database system in further detail, according to an example embodiment. Method 300, starting at step 302, can be performed by processing logic that can comprise hardware (e.g., circuitry, dedicated logic, programmable logic, microcode, etc.), software (e.g., instructions run on a processing device), or a combination thereof.

In step 304, master server 104 may receive a data backup request from a user via client application 102. In an embodiment, a data backup request may be automatically and periodically generated. A data backup request may also be automatically generated when log volumes grow too large. With reference to FIG. 6A, the user may have initiated a data backup "dbu22" at time "t22."

In step 306, the server receiving the data backup request may forward the data backup request to backup manager 108 on master server 104. In an embodiment, client application 102 may be connected to, for example, cohort server 120A. Cohort server 120A may use a topology module to determine a location of master server 104 and forward the request to the backup manager 108 of master server 104.

In step 308, backup manager 108 may initiate a global data backup and write the associated entry into backup catalog 106. In the foregoing example and with reference to FIG. 6B, backup manager 108 may insert two entries "dbu22," one for each of cohort server 120A and 120B.

In step 310, backup manager 108 may request the relevant cohort servers to create cohort server specific snapshots. In an embodiment, transaction manager 112 may block incoming transactions from client application 102. In the foregoing example, backup manager 108 request cohort server 120A and 120B to create snapshot 134.

In step 312, backup manager 108 may receive completion notifications from the cohort servers. In an embodiment, backup manager may then unblock incoming transactions from client application 102. In some embodiment, master server 104 may update backup catalog 106 accordingly. For example, backup manager 108 may receive a specific backup ID used by a cohort server 120 to identify the specific data backup. In the foregoing example, both cohort servers 120A and 120B happen to return "dbu22," which is then written into the local-event-ID field for both "dbu22A" and "dbu22B."

In step 314, backup manager 108 may request cohort servers 120 to perform the actual data backup. This process was explained above in FIG. 1, where data pages are copied from the snapshot to data backup storage 140.

In step 316, backup manager 108 may receive completion notifications of the data backups from cohort servers 120. In the foregoing example, backup manager may receive a failure notification for "dbu22A" and a success notification for "dbu22B."

In step 318, backup manager 108 may update backup catalog 106 accordingly. Method 300 then ends in step 320.

FIG. 4 is a flowchart illustrating a process for implementing log backups at a cohort server using a specific database management system in a heterogeneous database system, according to an example embodiment. As previously discussed, log backups may be initiated on a cohort server 120B independent of the other cohort servers 120. The specific procedures were previously explained in FIG. 1. Method 400, starting in step 402, can be performed by processing logic that can comprise hardware (e.g., circuitry, dedicated logic, programmable logic, microcode, etc.), software (e.g., instructions run on a processing device), or a combination thereof.

In step 404, log manager 130B in cohort server 120B may initiate log backup of log volume. Various reasons for initiation were discussed in FIG. 1.

In step 406, cohort server 120B may notify backup manager 108 of log backup initiation. With regard to FIG. 6A, cohort server 1201 may notify backup manager 108 of a log backup "lbu35B" at time "35," In an embodiment, the notification may be in the form of a callback, which may allow backup manager 108 to process the incoming notification at a later time. Backup manager 108 may first write the entry having event-guid "dbu22B" in backup catalog 106 and the cohort server 120B associated with the "dbu22B" into the vol-ID field.

In step 408, cohort server 120B may they perform the log backup. In the foregoing example, backup executor 128B may copy log volume 136B to log backup storage 142B. Further details regarding log backups were provided in FIG. 1.

In step 410, cohort server 120B may notify backup manager 108 when the log backup finishes. In an embodiment, the notification may include another callback, completion status information, and various offset values. In the foregoing example, backup manager 108 may then update the "lbu35B" entry of backup catalog 106. Updates ma include writing the prev-log-ID "lbu15B" which was the last recorded log backup for cohort server 120B. LBU Start and End offsets were updated to "51" and "100," respectively, indicating translated values for the starting and ending transaction records for log backup "lbu35B." The event status may also have been updated to success.

In step 412, cohort server 120B may free log volume 136B and overwrite old transaction records with new transactions in log volume 136B. Method 400 ends in step 414.

FIG. 5 is a flowchart illustrating a process for implementing consistent data recovery in a heterogeneous database system, according to an example embodiment. Method 500, starting in step 502, can be performed by processing logic that can comprise hardware (e.g., circuitry, dedicated logic, programmable logic, microcode, etc.), software (e.g., instructions run on a processing device), or a combination thereof.

In step 504, backup manager 108 may receive a recovery request including a selected recovery point from a user via client application 102, for example, a target timestamp for recovery. The recovery request may additionally contain recovery options, error options, or backup options desired by the user. A user may wish to recover heterogeneous database system 100 to a prior state when the system crashes, user makes an error, or any other reasons one skilled in the art would recognize. The prior state may include the data stored in cohort servers 120 of heterogeneous database system 100 at the time of the selected recovery point. Since backup manager 108 in master server 104 maintains a backup catalog 106 of global data backups and local log backups, users may select global backups initiated at particular timestamps associated with data backups or any point in time covered by the log backups for recovery. In some embodiments, backup manager 108 may receive a selected recovery point and a global backup from the backup catalog 106 to be used to recover heterogeneous database system 100 to the selected recovery point. With regard to FIG. 6A, the system may have crashed at time "t37," at which point the user decided to recover to time "t30," indicated by "PITR30A, B." In an embodiment, backup manager 108 may write recovery entries such as "PITR30A" and "PITR30B" into backup catalog 106 of FIG. 6B.

In step 506, backup manager 108 may determine if recovery to the specified point is possible using backup catalog 106. Part of determining whether a global and consistent recovery of the different DBMSs running on cohort servers 120 is possible includes finding the data and log backups from backup catalog 106 that are required for each of the affected cohort servers 120 in the heterogeneous database system to recover to the selected recovery point. A list of these data and log backups may be generated and stored by backup manager 108 to facilitate the backup process. In an embodiment, this determining may be accomplished by analyzing the data and log backups and relevant fields for each affected cohort server in back catalog 106. Using fields such as the event status field, backup manager 108 may identify data and log backups that may be corrupt and cannot be used in recovery. The previous log IDs and LBU start and end offsets may be used to determine if intermediate log backups are missing, known as log "holes," which also precludes recovery to a desired point in time. Backup manager 108 may additionally need to request log volume 136 information on cohort servers 120 to determine if the most recent not backed up transaction logs (which may be contained in log volume 136) have been corrupted.

In one embodiment, backup manager 108 may have received a recovery option such as "Check Files" as part of the recovery request in step 504. In this case, in step 506, backup manager 108 may check the sanity of the list of data and log backups by reading headers associated with the respective data and log backups. Backup manager 108 may identify and/or generate additional errors if sanity tests fail, for example, files were missing.

In the foregoing example, a recovery list of data and log backups may be generated for cohort servers 120A and 120B in order to determine if recovery to timestamp "t30" is possible. For example, for "PITR30A," backup manager 108 may first identify lbu37A, lbu28A, lbu25A using the prev-log-IDs. Though recovery to timestamp "30" is desired, a log backup up to time 37, "lbu37A," is necessary because the prior log backup only stored transactions up to time 28, "lbu28A." Backup manager 108 may have stopped identifying an earlier log backup than "lbu25A" because "lbu25A" directly follows a data backup "dbu22A." In some embodiments, backup manager 108 may recover more efficiently by identifying the latest valid data backup and subsequent log backups by comparing timestamps. However in the foregoing example, data backup, "dbu22A" failed as indicated in the event status field and may be removed from the recovery list. Therefore, backup manager 108 may additionally identify and add lbu20A, lbu10A, and dbu0A to the recovery list. By using the LBU start and end offsets, backup manager 108 may also verify, in the foregoing example, that no log backups for a recovery to time 30 in cohort server 120A was missing.

In step 508, if recovery to the selected point in time is possible, method 500 proceeds to step 510. In step 510, backup manager 108 may request the relevant cohort servers 120 to recover, in parallel, respective cohort servers 120 to a timestamp associated with an identified data backup using the identified data backup. In an embodiment where the user has selected a data backup, as discussed in step 502, the identified data backup is the selected data backup. In the foregoing example, backup manager 108 may request cohort servers 120A and 120B to recover using "dbu0A" and "dbu0B," respectively. In some embodiments, backup manager 108 may additionally request the relevant cohort servers 120 to recover by replaying specific log backups. For example, backup manager 108 may request cohort server 120A to replay log backups lbu28A, lbu25A, lbu20A, and lbu10A. Log backup "lbu37A" may not be played because the timestamp "37" exceeded the desired recovery point in time of "30."

As part of step 510, in an embodiment, backup manager 108 may initiate log backups at affected cohort servers 120 before determining whether the selected recovery point is possible. For example, backup manager 108 may send a request to take a log backup at cohort server 120A. In response to the request, cohort server 120A may initiate a log backup using the procedures discussed in FIG. 4. In some embodiments, these log backups are not initiated if the user includes a "CLEAR LOG" option in the recovery request described in step 504. These log backups may serve to preserve the transactions made in the current timeline before recovery. Additionally, these log backups may allow backup manager 104 to determine whether the log volumes 136 right before initiation of recovery was corrupted without needing to request additional information about log volumes 136 from cohort servers 120. Accordingly, in the foregoing example, log backups for cohort servers 120A and 120B may have been requested by backup manager 108, initiated at respective cohort servers 120. The respective entries lbu37A and lbu37B corresponding to the respective log backups may have been generated and inserted into backup catalog 106 of FIG. 6B.

In step 512, the currently recovered point in time is compared to the selected and desired recovery point to determine if recovery is complete. If a data backup or a recovery time corresponding to the timestamp of a data backup was selected, than cohort servers would have been requested to recover to the associated data backup in step 510 and the recovery point should be reached.

In step 514, if recovery point was not reached (as determined in step 512), master server 104 may replay a specified amount of the master transaction records up to the selected point in time in the master log following the data backup identified in step 506 based on the log backups in backup catalog 106. The specified amount of records may be a predetermined amount or vary depending on a status of heterogeneous database system 100. The status may include congestion in heterogeneous database system 100 or processing speed of cohort servers 120 among other system parameters. In an embodiment, the specified amount may be an amount corresponding to the end of a log backup of one relevant cohort server 120 or the lesser of a predetermined amount and an amount corresponding to the end of any cohort server 120 log backup. In an alternate example, assuming the identified data backup was "dbu22A" and "dbu22B" associated with a timestamp of "22," log replay coordinator 110 may identify offsets of "150" and "60," corresponding to the DBU redo offset of cohort servers 120A and 120B, respectively. For volume "120A," log replay coordinator 110 may request transaction manager 112 to locate the transaction occurring at timestamp "22" associated with an offset of "150" in the master log and play a specified amount of subsequent transactions. As explained with regard to FIG. 7, a transaction distributed across cohort servers 120 may have cohort server specific offset values which are used by the respective cohort servers 120 to locate the distributed transaction at respective cohort servers 120.

In step 518, log replay coordinator 110 of backup manager 108 may forward offset values, or redo log positions, identified for cohort servers 120 and request cohort servers 120 to replay their transaction logs stored in log backup storage 142 up to the offset values. The cohort servers may then replay their respective transaction logs stored in log backup storage 142 (or log volume 136) up to the offset value. These offset values may sometimes be known as redo log positions because cohort servers 120 redoes the transaction logs up to the specified log position. In some embodiments, backup manager 108 may also notify relevant cohort servers that the selected recovery point is reached as part of the request. In an embodiment described in FIG. 1, cohort server 120A may not be able to process intermediate recovery offsets. In this particular embodiment, bridge interface 122 may buffer or ignore the intermediate offsets until a final offset is received.

In step 520, backup manager 108 may update backup catalog 106 accordingly. In the foregoing example, point in time recovery was successful and the event status field Was updated to "success" for both the "PITR30A" and "PITR30B" entries. Backup manager 108 may also save the log offsets sent to each respective cohort server 120 on master server 104.

In step 522, backup manager 108 may receive log backup entries from relevant cohort servers 120 if the specified offsets are associated with a transaction that corresponds to the selected recovery point. If no log backup entry is received, then method 500 proceeds to step 512.

If a log backup entry is received in step 522, the method 500 proceeds to step 524. In step 524, backup manager 108 adds the received log backup entry to the backup catalog 106, as previously discussed in FIG. 4.

Returning to step 508, if recovery to the selected point in time is not possible, method 500 proceeds to step 526. In step 526, backup manager 108 may identify the errors specified in step 506 and/or identify recovery options. For example, one recovery option is to identify the most recent possible recovery point in time prior to the selected recovery point in time using the data and log backups from the backup catalog 106 along with the master log in master log volume 114. In an embodiment, step 518 is performed using a procedure similar to the procedures discussed with regard to FIG. 1.

In step 528, backup manager 108 may notify the user via client application 102 of identified errors and/or recovery options from step 526.

Returning to step 512, if the recovery point was reached, method 500 proceeds to step 530. In step 530, backup manager 108 may receive a recovery status from each of the relevant cohort servers 120. In an embodiment, upon receiving an offset corresponding to the selected recovery point, the respective cohort server 120 may redo its transactions 102 as described in step 518 and subsequently restart the respective cohort server 120. A recovery status may indicate whether the respective cohort server 120 was able to successfully replay its logs and restart.

In step 532, backup manager 108 may update backup catalog 106 accordingly. For example, upon receiving recovery statuses described in step 530, backup manager 108 may mark a finished and successful recovery for an associated recovery entry in backup catalog 106. In some embodiments, cohort servers 120 may initiate log backups, as described in FIG. 4, upon a restart. In these embodiments, backup manager 108 may additionally update backup catalog 106 by inserting new log backup entries. In the example provided in FIG. 6B, the event statuses for the point-in-time recovery entries "PITR30A" and "PITR30B" have been updated to "Success."

Figure 8:
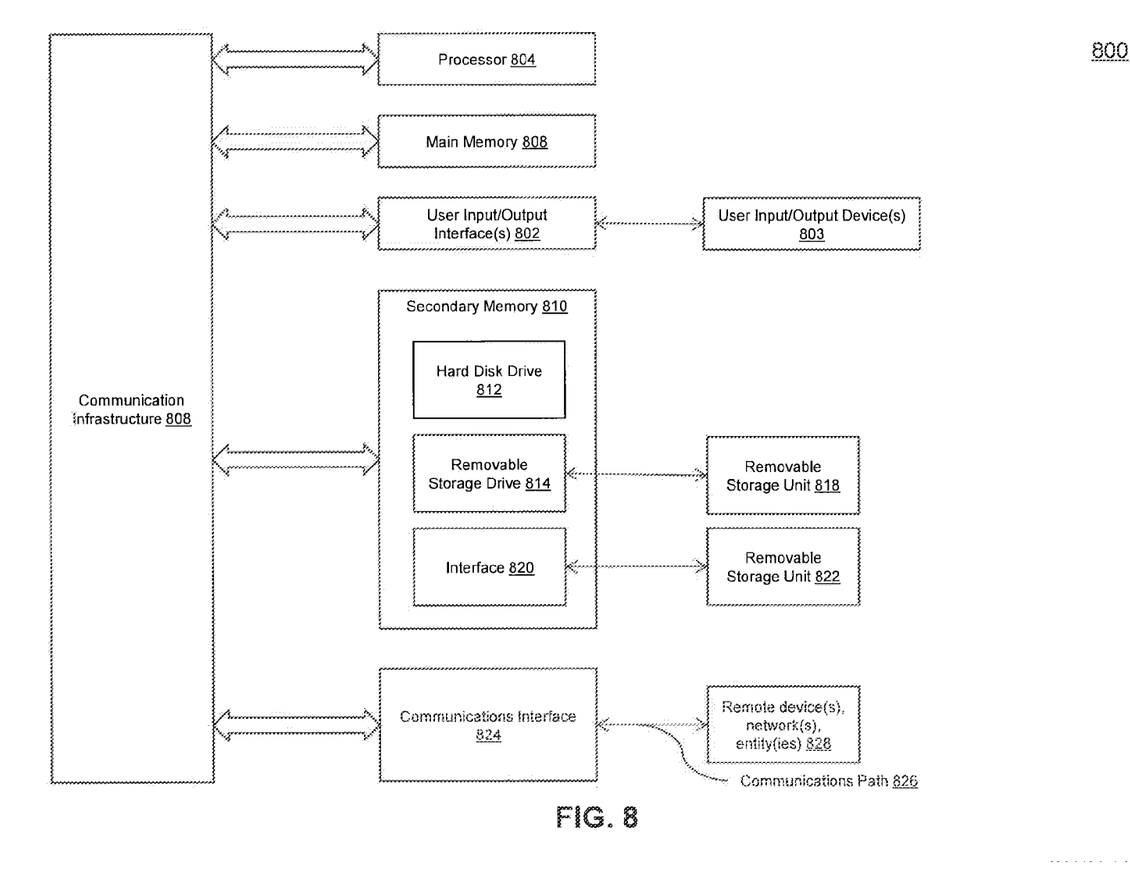
FIG. 8 is an example computer system useful for implementing various embodiments.

Various embodiments can be implemented, for example, using one or more well-known computer systems, such as computer system 800 shown in FIG. 8. Computer system 800 can be any well-known computer capable of performing the functions described herein.

Computer system 800 includes one or more processors (also called central processing units, or CPUs), such as a processor 804. Processor 804 is connected to a communication infrastructure or bus 806.

One or more processors 804 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communication infrastructure 806 through user input/output interface(s) 802.

Computer system 800 also includes a main or primary memory 808, such as random access memory (RAM). Main memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In an embodiment, a tangible apparatus or article of manufacture comprising a tangible computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 8. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (Whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following, claims and their equivalents.

What is claimed is:

1. A method, comprising:
first performing a global data backup of a heterogeneous database system comprising a first database management system (DBMS) at a first server and a second DBMS at a second server;
first recording, in a backup catalog, one or more global data backup entries representative of the global data backup performed by the first and second DBMS on the respective first and second servers;
receiving log backup notifications, from the first and second servers, indicating asynchronous log backups performed on the first server and the second server;
second recording, in the backup catalog, log backup entries representative of the performed asynchronous log backups, in response to receiving the log backup notifications; and
second performing a point-in-time recovery of the heterogeneous database system using the backup catalog, wherein at least one of the first performing, first recording, receiving, second recording, and second performing are performed by one or more computers.

2. The method of claim 1, the first performing comprising:
requesting the first server to create a first snapshot using the first DBMS;
requesting the second server to create a second snapshot using the second DBMS; and
upon receiving successful notifications of completing the first and second snapshots, requesting the first DBMS to create a first data backup based on the first snapshot and the second DBMS to create a second data backup based on the second snapshot.

3. The method of claim 1, wherein the log backup entries comprise start offsets, end offsets, completion statuses of the corresponding asynchronous log backups, and pointers to at least one previous asynchronous log backup.

4. The method of claim 1, wherein an asynchronous log backup from the asynchronous log backups is initiated by the first DBMS based on a current size of a log volume on the first server and a time a previous asynchronous log backup was initiated by the first DBMS.

5. The method of claim 1, further comprising:
committing a global transaction distributed across the heterogeneous database system;
receiving a first transaction offset from the first DBMS indicating a first location of the global transaction on the first server;
receiving a second transaction offset from the second DBMS indicating a second location of the global transaction on the second server; and
recording the global transaction, the first transaction offset, and the second transaction offset as a log record into a master log.

6. The method of claim 5, the second performing comprising:
generating a recovery list of backup catalog entries required to allow the first DBMS and the second DBMS to recover to a recovery timestamp indicated by the point-in time recovery, wherein the backup catalog entries are selected from the one or more global data backup entries and the log backup entries.

7. The method of claim 6, the second performing further comprising:
determining whether the log record from the master log for the global transaction is associated with the recovery timestamp using the recovery list;
requesting the first DBMS to recover the first server to the first transaction offset; and
requesting the second DBMS to recover the second server to the second transaction offset.

8. The method of claim 7, the second performing further comprising:
replaying selected parts of the master log to locate the global transaction, wherein the parts are selected based on the recovery list.

9. The method of claim 7, the second performing further comprising:
replaying selected parts of the master log to locate an intermediate transaction associated with an intermediate timestamp earlier than the recovery timestamp;
requesting the first DBMS to recover the first server to a first intermediate transaction offset associated with the intermediate transaction; and
requesting the second DBMS to recover the second server to a second intermediate transaction offset associated with the intermediate transaction.

10. A system, comprising:
a memory; and
at least one processor coupled to the memory and configured to:
perform a global data backup of a heterogeneous database system comprising a first database management system (DBMS) at a first server and a second DBMS at a second server;
record, in a backup catalog, one or more global data backup entries representative of the global data backup performed by the first and second DBMS on the respective first and second servers;
receive log backup notifications, from the first and second servers, indicating asynchronous log backups performed on the first server and the second server;
record, in the backup catalog, log backup entries representative of the performed asynchronous log backups, in response to receiving the log backup notifications; and
perform a point-in-time recovery of the heterogeneous database system using the backup catalog.

11. The system of claim 10, wherein to perform a global data backup the at least one processor is configured to:
request the first server to create a first snapshot using the first DBMS;
request the second server to create a second snapshot using the second DBMS; and
upon receiving successful notifications of completing the first and second snapshots, request the first DBMS to create a first data backup based on the first snapshot and the second DBMS to create a second data backup based on the second snapshot.

12. The system of claim 10, wherein the log backup entries comprise start offsets, end offsets, completion statuses of the corresponding asynchronous log backups, and pointers to at least one previous asynchronous log backup.

13. The system of claim 10, wherein an asynchronous log backup from the asynchronous log backups is initiated by the first DBMS based on a current size of a log volume on the first server and a time a previous asynchronous log backup was initiated by the first DBMS.

14. The system of claim 10, the at least one processor configured to:
commit a global transaction distributed across the heterogeneous database system;
receive a first transaction offset from the first DBMS indicating a first location of the global transaction on the first server;
receive a second transaction offset from the second DBMS indicating a second location of the global transaction on the second server; and
record the global transaction, the first transaction offset, and the second transaction offset as a log record into a master log.

15. The system of claim 14, wherein to perform the point-in-time recovery the at least one processor is configured to:
generate a recovery list of backup catalog entries required to allow the first DBMS and the second DBMS to recover to a recovery timestamp indicated by the point-in time recovery, wherein the backup catalog entries are selected from the one or more global data backup entries and the log backup entries.

16. The system of claim 15, wherein to perform the point-in-time recovery the at least one processor is further configured to:
determine whether the log record from the master log for the global transaction is associated with the recovery timestamp using the recovery list, wherein the determining comprises replaying selected parts of the master log to locate the global transaction, wherein the parts are selected based on the recovery list;
request the first DBMS to recover the first server to the first transaction offset; and
request the second DBMS to recover the second server to the second transaction offset.

17. The system of claim 16, wherein to perform the point-in-time recovery the at least one processor is further configured to:
replay selected parts of the master log to locate an intermediate transaction associated with an intermediate timestamp earlier than the recovery timestamp;
request the first DBMS to recover the first server to a first intermediate transaction offset associated with the intermediate transaction; and
request the second DBMS to recover the second server to a second intermediate transaction offset associated with the intermediate transaction.

18. A tangible computer-readable device having instructions stored thereon that, when executed by at least one computing device, causes the at least one computing device to perform operations comprising:
first performing a global data backup of a heterogeneous database system comprising a first database management system (DBMS) at a first server and a second DBMS at a second server;
first recording, in a backup catalog, one or more global data backup entries representative of the global data backup performed by the first and second DBMS on the respective first and second servers;
receiving log backup notifications, from the first and second servers, indicating asynchronous log backups performed on the first server and the second server;
second recording, in the backup catalog, log backup entries representative of the performed asynchronous log backups, in response to receiving the log backup notifications; and
second performing a point-in-time recovery of the heterogeneous database system using the backup catalog.

19. The computer-readable device of claim 18, the operations further comprising:
committing a global transaction distributed across the heterogeneous database system;
receiving a first transaction offset from the first DBMS indicating a first location of the global transaction on the first server;
receiving a second transaction offset from the second DBMS indicating a second location of the global transaction on the second server; and
recording the global transaction, the first transaction offset, and the second transaction offset as a log record into a master log.

20. The computer-readable device of claim 19, the second performing comprising:
generating a recovery list of backup catalog entries required to allow the first DBMS and the second DBMS to each recover to a recovery timestamp indicated by the point-in time recovery, wherein the backup catalog entries are selected from the one or more global data backup entries and the log backup entries;
determining whether the log record from the master log for the global transaction is associated with the recovery timestamp using the recovery list, wherein the log record was located by replaying selected parts of the master log using the recovery list;
requesting the first DBMS to recover the first server to the first transaction offset; and
requesting the second DBMS to recover the second server to the second transaction offset.

* * * * *